(12) United States Patent
Wood et al.

(10) Patent No.: US 8,220,737 B2
(45) Date of Patent: Jul. 17, 2012

(54) VTOL AERIAL VEHICLE

(75) Inventors: Ryan S. Wood, Broomfield, CO (US); Darold B. Cummings, Coeur D'Alene, ID (US); David W. Hall, Morro Bay, CA (US)

(73) Assignee: Frontline Aerospace, Inc., Broomfield, CO (US)

( * ) Notice: Subject to any disclaimer, the term of this patent is extended or adjusted under 35 U.S.C. 154(b) by 736 days.

(21) Appl. No.: 12/480,312

(22) Filed: Jun. 8, 2009

(65) Prior Publication Data

US 2010/0224721 A1 Sep. 9, 2010

Related U.S. Application Data

(60) Provisional application No. 61/059,627, filed on Jun. 6, 2008.

(51) Int. Cl.
*B64C 29/00* (2006.01)
*B64C 15/02* (2006.01)
*B64C 15/14* (2006.01)
*B64C 23/06* (2006.01)
*B64C 3/58* (2006.01)
*B64C 39/06* (2006.01)

(52) U.S. Cl. ............... 244/12.3; 244/23 B; 244/199.4; 244/45 R; 244/55; 244/87

(58) Field of Classification Search ................ 244/12.1, 244/12.3, 23 R, 23 B, 36, 45 R, 199.4, 55, 244/87
See application file for complete search history.

(56) References Cited

U.S. PATENT DOCUMENTS

| 1,667,002 | A | * | 4/1928 | Hall ................................. 244/5 |
| 2,988,301 | A | * | 6/1961 | Fletcher ....................... 244/12.3 |
| 3,559,921 | A | * | 2/1971 | Timperman ................. 244/12.3 |
| 4,208,025 | A | | 6/1980 | Jefferson |
| 4,272,043 | A | * | 6/1981 | Spillman ....................... 244/130 |
| 4,365,773 | A | * | 12/1982 | Wolkovitch ................. 244/45 R |
| 4,471,923 | A | | 9/1984 | Hoppner et al. |
| D304,821 | S | * | 11/1989 | Ratony ......................... D12/331 |
| 5,026,002 | A | * | 6/1991 | Yarrington ................... 244/12.1 |
| 5,064,143 | A | | 11/1991 | Bucher |
| 5,149,012 | A | | 9/1992 | Valverde |
| 5,303,879 | A | | 4/1994 | Bucher |
| 5,318,248 | A | | 6/1994 | Zielonka |
| 5,372,337 | A | | 12/1994 | Kress et al. |
| 5,407,150 | A | | 4/1995 | Sadleir |
| 5,419,513 | A | | 5/1995 | Flemming, Jr. et al. |
| 5,421,538 | A | | 6/1995 | Vassa (Suratano Thienphropa) |
| 5,454,531 | A | * | 10/1995 | Melkuti ...................... 244/12.6 |
| 5,503,352 | A | | 4/1996 | Eger |
| 5,507,453 | A | * | 4/1996 | Shapery ...................... 244/12.5 |

(Continued)

*Primary Examiner* — Tien Dinh
*Assistant Examiner* — Joseph W Sanderson
(74) *Attorney, Agent, or Firm* — Marsh Fischmann & Breyfogle LLP

(57) ABSTRACT

An aircraft capable of vertical take-off and landing is provided. The aircraft includes a fuselage having a forward portion and an aft portion. A lift fan extends though a duct, which extends through the fuselage. The aircraft further includes a pair of wing sets where each set of wings include first and second wings. Each set of wings has a first wing with a first wing root interconnected to the fuselage forward of a central axis of the lift fan and a second wing having a second wing root interconnected to the fuselage aft of the central axis of the lift fan. The tips of each set of wings are connected. The aircraft further includes a pusher fan.

27 Claims, 9 Drawing Sheets

U.S. PATENT DOCUMENTS

| | | | |
|---|---|---|---|
| 5,779,190 A | 7/1998 | Rambo et al. | |
| 5,873,545 A | 2/1999 | Kapin et al. | |
| 5,890,441 A * | 4/1999 | Swinson et al. | 244/12.3 |
| 5,899,409 A * | 5/1999 | Frediani | 244/13 |
| 6,270,038 B1 | 8/2001 | Cycon et al. | |
| 6,450,446 B1 | 9/2002 | Holben | |
| 6,457,670 B1 | 10/2002 | Geranio et al. | |
| 6,607,162 B2 | 8/2003 | Warsop et al. | |
| 6,847,865 B2 | 1/2005 | Carroll | |
| 6,848,649 B2 * | 2/2005 | Churchman | 244/12.6 |
| 6,883,748 B2 | 4/2005 | Yoeli | |
| 6,892,979 B2 * | 5/2005 | Milde, Jr. | 244/12.3 |
| 6,974,106 B2 * | 12/2005 | Churchman | 244/12.6 |
| 7,032,859 B2 | 4/2006 | Mohr | |
| 7,032,861 B2 | 4/2006 | Sanders, Jr. et al. | |
| 7,044,422 B2 | 5/2006 | Bostan | |
| 7,210,654 B1 | 5/2007 | Cox et al. | |
| 7,246,769 B2 * | 7/2007 | Yoeli | 244/23 B |
| 7,281,680 B2 * | 10/2007 | Melkuti | 244/12.5 |
| 7,410,122 B2 * | 8/2008 | Robbins et al. | 244/12.3 |
| 2003/0062442 A1 | 4/2003 | Milde | |
| 2004/0232279 A1 | 11/2004 | Melkuti | |
| 2005/0082422 A1 | 4/2005 | Tierney | |
| 2005/0127239 A1 | 6/2005 | Srivastava | |
| 2005/0151003 A1 * | 7/2005 | Churchman | 244/12.3 |
| 2006/0144991 A1 * | 7/2006 | Frediani | 244/45 R |
| 2007/0057113 A1 | 3/2007 | Parks | |

* cited by examiner

VTOL AERIAL VEHICLE

CROSS-REFERENCE TO RELATED APPLICATION

This application claims priority and the benefit of the filing date under 35 U.S.C. 119 to U.S. Provisional Application No. 61/059,627, entitled, "VTOL Aerial Vehicle," filed on Jun. 6, 2008, the contents of which are incorporated herein as if set forth in full.

FIELD OF INVENTION

The present invention relates to vertical takeoff and landing (VTOL) aerial vehicles. In particular, the application is directed towards a high-speed VTOL vehicle having extended range and payload capabilities. One embodiment is a VTOL unmanned aerial vehicle (UAV).

BACKGROUND OF THE INVENTION

Use of unmanned aerial vehicles (UAVs) has become increasingly common with the advent of automated flight based on GPS as well as real-time communications that allow for remote UAV operation. For example, UAVs are commonly used by the military to provide surveillance, reconnaissance, target acquisition, communications relay, casualty evacuation, ordinance delivery and/or supply flights.

There are various types of UAV configurations. Generally, such UAV configurations may be separated into three categories. A first UAV configuration is a fixed wing configuration that is similar to an airplane. A second configuration is a helicopter type configuration that utilizes a rotor mounted above the vehicle to provide lift and thrust. A third configuration is a ducted type configuration having a fuselage with a ducted rotor that provides vertical takeoff and landing capabilities. Each of these UAV configurations provides certain benefits and drawbacks.

For instance, fixed wing UAVs typically take off and land like an ordinary airplane. Accordingly, the UAV requires a runway to create sufficient airflow over the wings of the UAV such that it may take off. Likewise, landing may require a runway. A further difficulty with fixed wing UAV configurations is that such UAVs may not operate effectively in confined air space. That is, as fixed wing UAVs require forward motion to maintain lift, they are not capable of hovering over a fixed spatial point. Accordingly, such fixed wing UAVs are not optimized at delivering logistics supplies, ordinances or payloads to designated targets. However, fixed wing UAVs do provide the benefit of being able to travel at greater speeds and longer distances than most other UAV configurations as they have better aerodynamic lift and drag characteristics.

Helicopter UAV configurations provide the benefit of vertical takeoff and landing as well as the ability to hover over fixed spatial points. This allows helicopter UAV configurations to be utilized to deliver ordinances and/or supplies to designated locations. However, such helicopter UAV configurations often have relatively slow forward speeds as the rotating blades create a large aerodynamic drag. In this regard, both the speed and the range of helicopter UAV configurations can be limited.

Ducted type UAVs often include a ducted fuselage shrouding coaxial, counter-rotating rotors. Such rotors are designed to provide thrust necessary for both vertical and forward flights. In this regard, such ducted type UAVs also permit vertical takeoff and landing. Typically, to provide forward movement (e.g., horizontal movement), the aircraft fuselage must nose down in order to generate horizontal thrust. Such ducted type UAVs often suffer from stability issues as well as limited speed in forward flight. In particular, the ducted rotors cannot be oriented such that the plane of rotors is perpendicular to the direction of travel of the aircraft.

SUMMARY OF THE INVENTION

One object of the present invention is to provide a VTOL aircraft, which may be a UAV aircraft, that is capable of vertical takeoff and landing, is capable of traveling of slow speeds including hover. It also permits high speed horizontal flight (i.e., forward flight) to allow for increased range of the aircraft.

According to a first aspect, a VTOL aircraft is provided. The aircraft includes a fuselage having a forward portion, an aft portion and top and bottom surfaces. A duct extends through the fuselage defining openings in the top and bottom surfaces. A lift fan is disposed within the duct that is operative to draw air through the opening in the top of the fuselage and exhaust air through the opening in the bottom surface of the fuselage. In one arrangement, the lift fan has first and second counter rotating rotors. In any arrangement, a rotational axis of the rotor(s) of the lift fan may define a vertical reference axis. Generally, the lift fan provides vertical lift for the aircraft though in some arrangements the lift fan may also provide some or all of the horizontal thrust utilized for forward flight. The aircraft further includes a pair of wing sets where each set of wings include first and second wings. In one arrangement, each set of wings has a first wing having a first wing root interconnected to the fuselage forward of the vertical reference axis of the lift fan and a second wing having a second wing root interconnected to the fuselage aft of vertical reference axis defined by the lift fan. In one arrangement, distal portions of the wings are connected. In one arrangement, the wing sets may include a plate that connects distal portions of the first and second wings. In one particular arrangement, this plate is an end plate interconnected to the ends of the first and second wings. Such wings may provide lift for the aircraft during forward flight.

When each set of wings is interconnected to the fuselage at points forward and aft of the vertical reference axis defined by the lift fan, the center of gravity may be disposed between these forward and aft connections to improve stability of the aircraft. In one particular embodiment, the center of gravity of the aircraft is located coincidentally with the rotational axis of the lift fan.

In a further arrangement, the aircraft includes a means for providing forward thrust. In one arrangement, one or more louvers or ducts may be utilized with the lift fan to redirect air from the lift fan rotors towards an aft portion of the aircraft and thereby provide forward thrust. In a further arrangement, the aircraft includes a pusher fan or prop assembly. In one particular arrangement, such a pusher fan or prop assembly may be connected to an aft portion of the fuselage. In any arrangement, one or more engines may be utilized to provide motive force the lift fan and/or pusher fan/prop assembly. In one particular arrangement, at least first and second motors are utilized to operate the lift fan and/or pusher fans. In such an arrangement, one or more transmissions may be incorporated into the aircraft that allow for selectively engaging and disengaging the lift and/or pusher fans/prop assemblies.

In one arrangement, the rotor(s) of the lift fan may define a toroidal fan where diameter of the hub of the fan is larger than the blade length of the rotor(s). In such an arrangement, an area below the hub of a toroidal fan may form a payload bay for the aircraft. The rotational axis of the rotor(s) may likewise be aligned with the center of gravity of the aircraft.

In one arrangement, louvers may be connected to the openings of the duct, which may be operative to direct airflow into or out of the duct and/or close the duct. For instance, during forward flight, the duct may be closed and the lift fan may be disengaged such that forward thrust is provided by an alternate motive of force such as a pusher fan, prop or other thrust producing mechanism (e.g., jet engine). In one particular arrangement, louvers on the bottom of the fuselage may be adjustable such that exhaust air from the lift fan rotor may be directed towards the rear/aft of the aircraft to provide forward thrust.

In one arrangement, where the wing sets utilize an end plate, such an end plate may be utilized to mount additional components to the aircraft. In one particular arrangement, additional air foils may be mounted to the end plates. Such air foils may be selectively deployable to provide additional lift that may allow, for example, reduced forward flying speeds for the aircraft. Likewise, such air foils may be retracted to allow reduced drag during high speed forward flight.

In a further arrangement, the aircraft may utilize a plurality of puffer jets or other air outlet nozzles that may be located variously on the wings and/or fuselage to provide additional stability for the aircraft. That is, when the aircraft is hovering, it may be desirable to utilize such puffer jets to maintain the aircraft in a flat and level orientation.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

Reference will now be made to the drawings wherein like numerals refer to like parts throughout. Though discussed herein primarily in reference to unmanned aerial vehicles (UAVs), it will be expressly understood that various aspects of the disclosure have broader application. In particular, various aspects of the disclosed aerial vehicle are applicable to manned aerial vehicles. Therefore, the proceeding disclosure is provided by way of example and not by way of limitation.

Figure 1A:
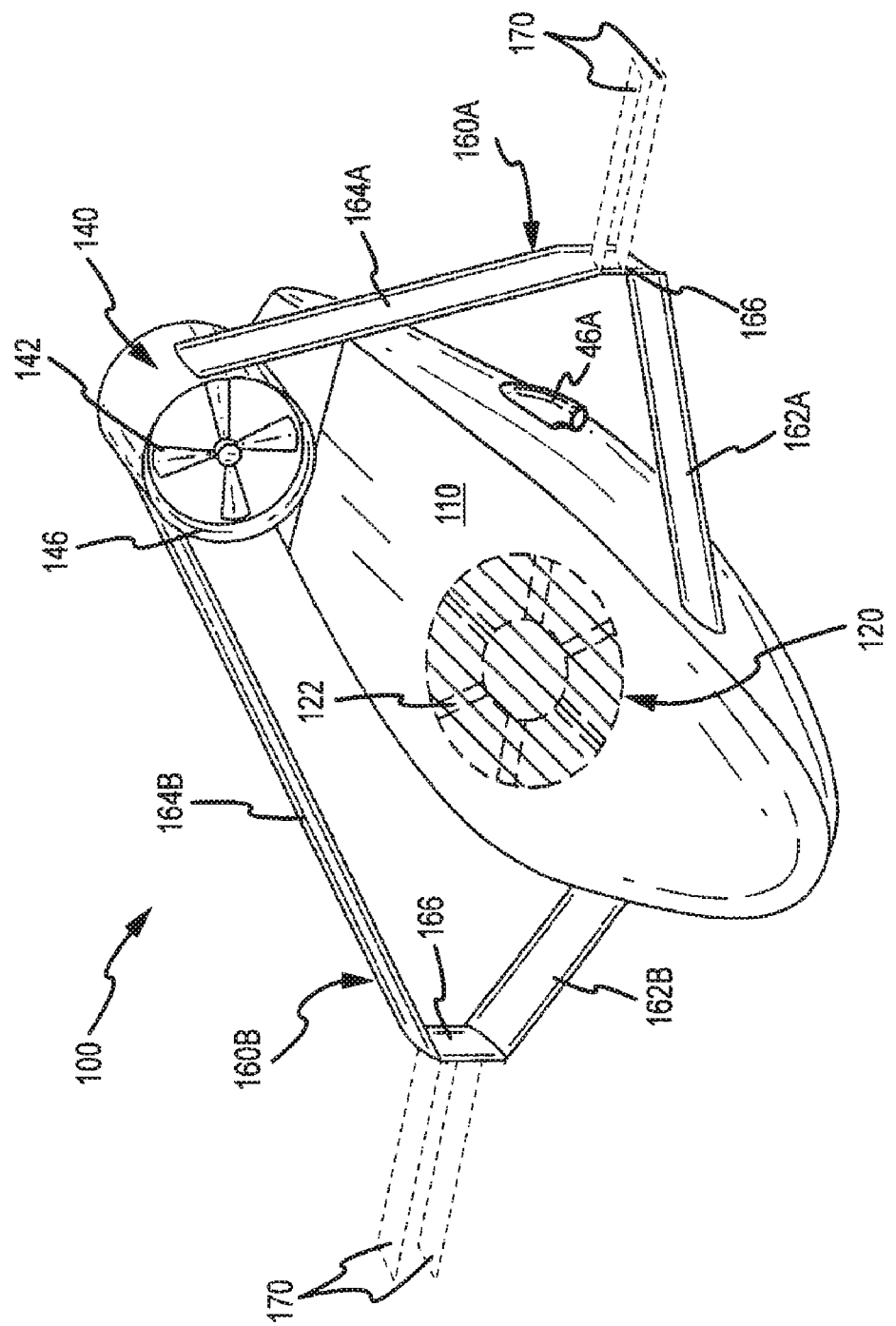
FIGS. 1A and 1B illustrates perspective and top views of one embodiment of a VTOL aircraft.
Figure 1B:
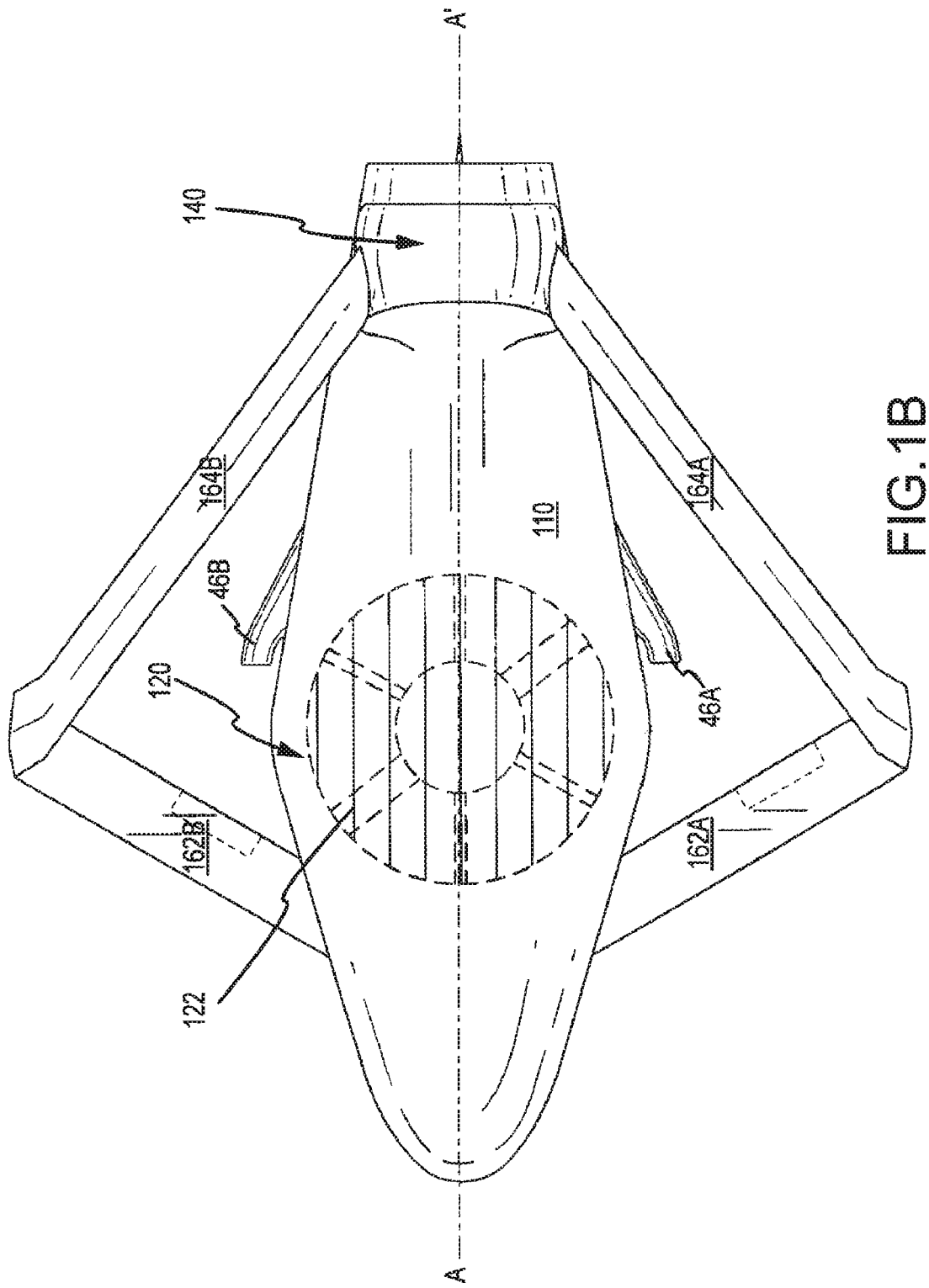

FIGS. 1A and 1B illustrates perspective and top views of one embodiment of an unmanned aerial vehicle (UAV) or aircraft 100 in accordance with one aspect of the present invention. The aircraft 100 includes a fuselage 110 that houses a ducted fan assembly 120. The ducted fan assembly is defined by a dual rotor assembly 122 that is mounted within a duct 118 that extends substantially vertically through the fuselage 110. Generally, the rotor assembly 122 is fixedly connected within the fuselage in axial alignment with the duct 118 via one or more axial struts.

The aircraft 100 also includes a shrouded pusher fan assembly 140. As will be further discussed herein, the ducted fan assembly 120 provides for vertical lift as well as some thrust for transition between vertical and forward flight. The shrouded pusher fan assembly 140 provides forward propulsion for the aircraft. To provide lift during forward flight, the illustrated embodiment of the aircraft 100 utilizes a box wing arrangement. As will be discussed herein, such box wings provide for improved aspect ratio as well as improved lift. Each of these components is further discussed herein.

Figure 2A:
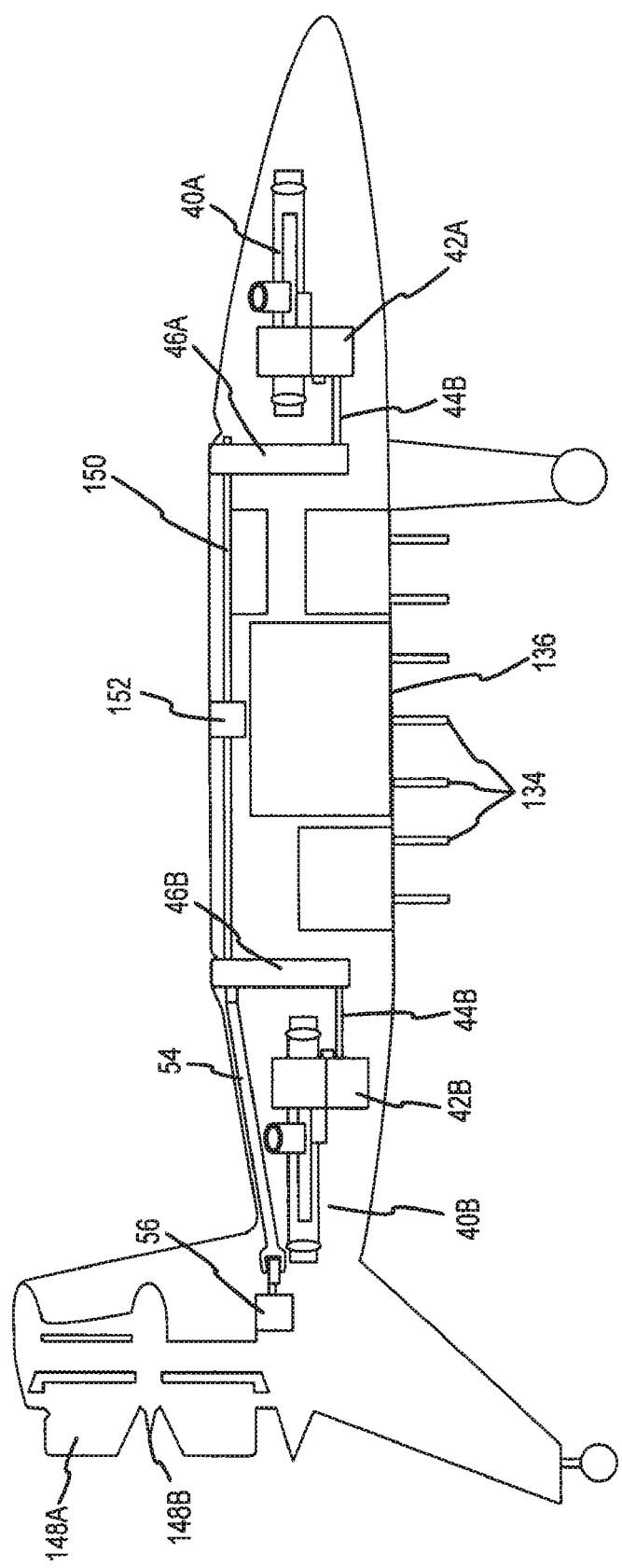
FIG. 2A illustrates a cross-sectional view of the VTOL aircraft along a centerline of the aircraft.
Figure 2B:
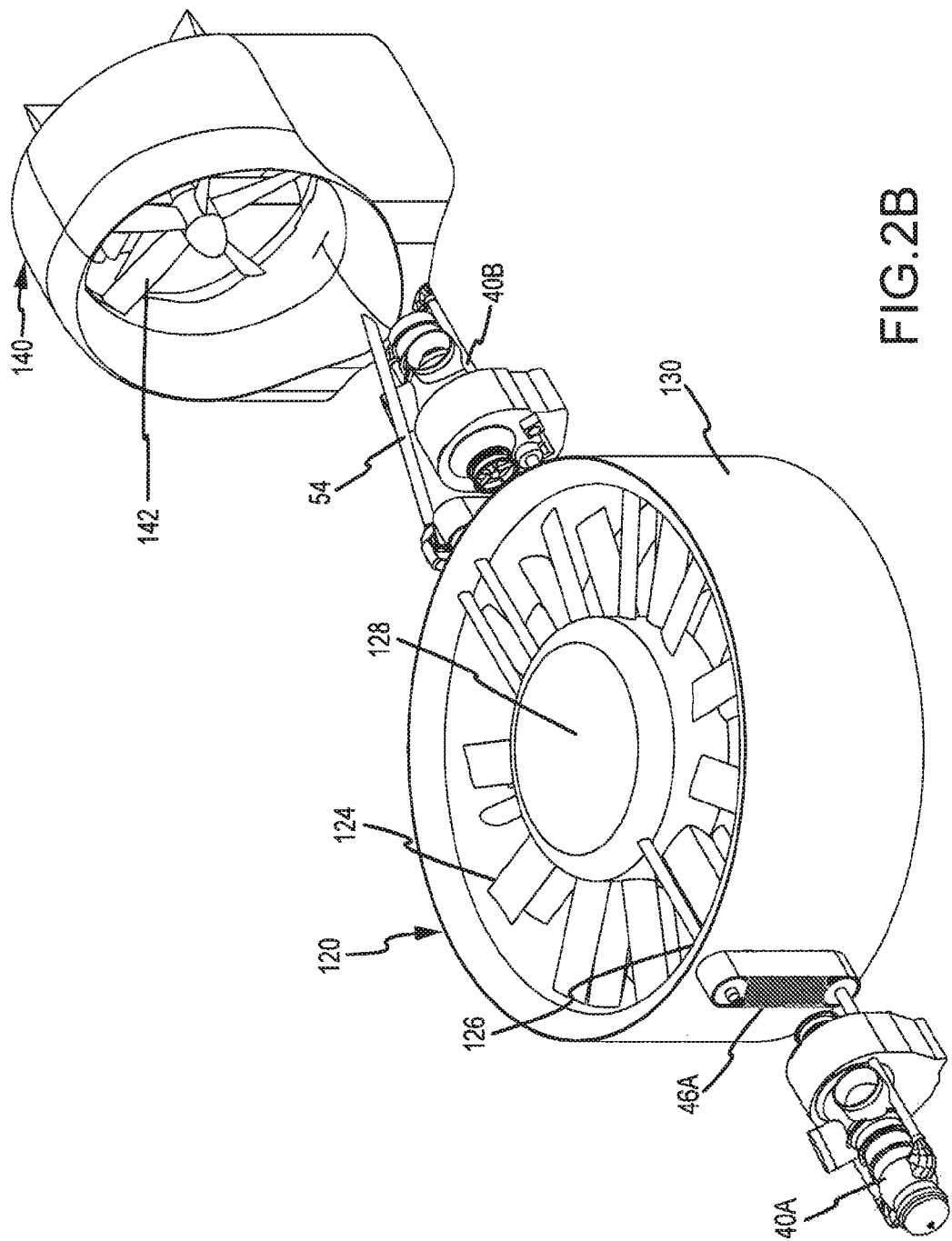
FIG. 2B illustrates a power system of the VTOL aircraft.

As noted above, the ducted fan assembly 120 provides vertical takeoff and landing (hereafter VTOL) capabilities for the aircraft 100. Furthermore, the ducted fan assembly 120 allows the aircraft hover during operation. In this particular embodiment, the dual rotor assembly 122 is defined by a toroidal lift fan that uses counter rotating lift rotors, which rotate about a center hub 128, as best illustrated in FIGS. 2A and 2B. These rotors 124, 126 may optionally incorporate a plurality of blades that are variable pitch blades. Such variable pitch blades allow changing the angle of the blades to alter the propulsion force provided by the rotor assembly 120. However, this is not a requirement. In another arrangement, the rotors 124, 126 may be rigid rotors to reduce the complexity and weight of the assembly 120.

As shown, the rotors 124, 126 rotate around a central hub 128 of the toroidal fan assembly. As will be discussed herein, use of such a toroidal assembly allows for providing a mounting location below the hub 128. This permits, inter alia, attaching a payload to the aircraft 100 at the center of gravity of the aircraft. The outside ends of the rotor assemblies 124, 126 are enclosed by a shroud. As will be appreciated, this shroud 130 is aligned with the duct 118 extending through the fuselage 110. Generally, the hub diameter or annulus of the toroidal lift fan assembly is greater than the blade length of the rotors 124, 126. As will be discussed, this allows for increasing the size of a payload bay that is below the annulus/hub of the assembly.

In operation, the toroidal fan assembly 120 is operative to draw air in from an upper surface of the fuselage of the aircraft and push air through the bottom surface of the fuselage in order to generate lift. It will be appreciated that use of the counter-rotating rotors 126, 128 reduces or eliminates torsion applied to the aircraft by the rotors providing enhanced stability. Furthermore, use of the rotating fans can provide some precisional stability to the aircraft during hovering and/or takeoff and landing situations.

Figure 3:
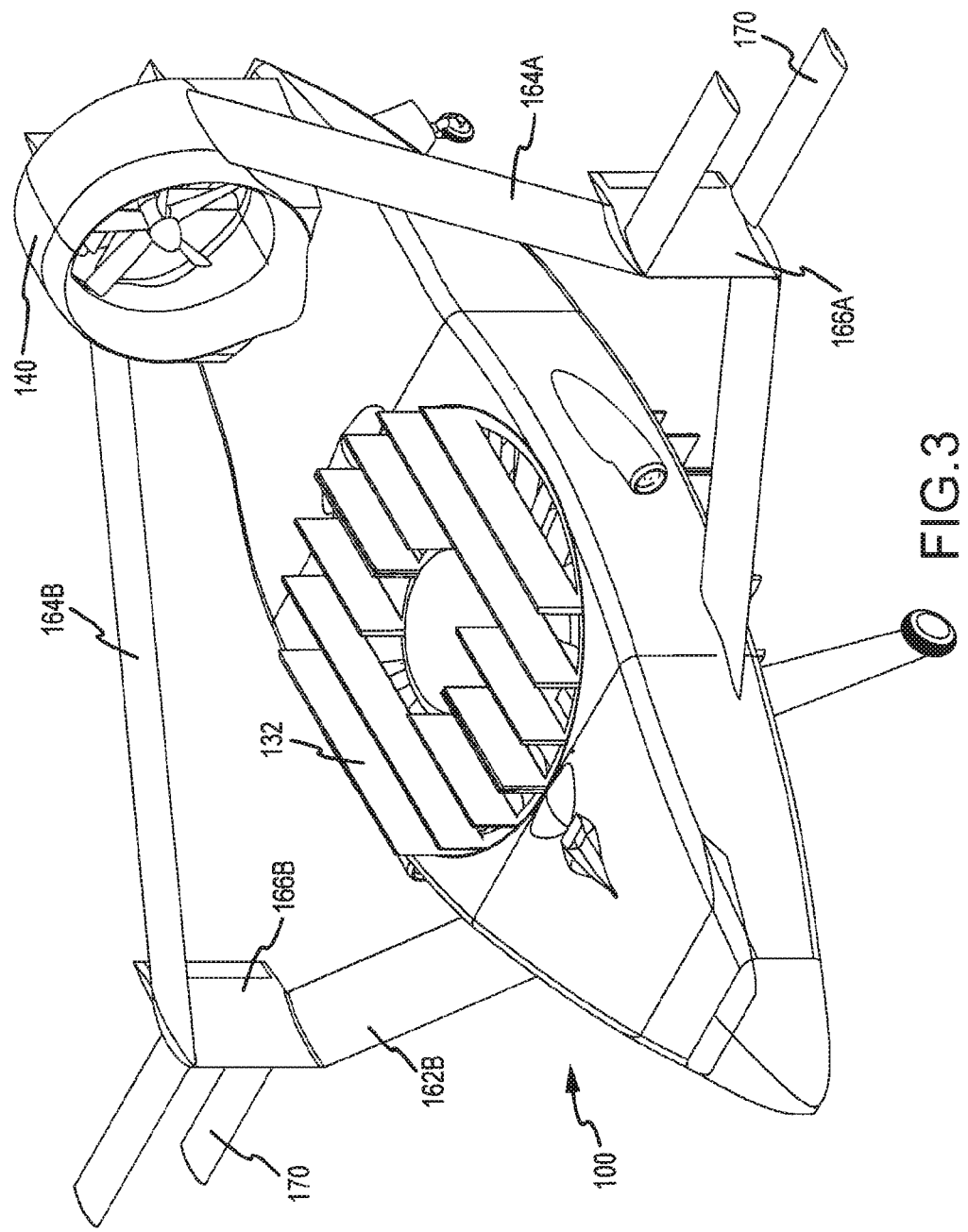
FIG. 3 illustrates a perspective view of the VTOL aircraft.

The aircraft utilizes inlet and outlet louvers as best illustrated by FIGS. 2A and 3 to selectively permit drawing air into the toroidal fan assembly 120 and pushing air out of the bottom of the aircraft 100. As shown, the inlet louvers 132 are positioned on the top of the aircraft and are aligned in the direction of forward travel of the aircraft. In contrast, the outlet louvers are positioned on the bottom of the aircraft and are aligned substantially perpendicular to the direction of forward travel of the aircraft. It will be appreciated that in transition between vertical and horizontal flight, the outlet louvers 134 may be angled to deflect the outlet air from the fan assembly 120 toward the rear of the aircraft and thereby provide forward thrust for the aircraft. This may aid in the transition from, for example, hovering to complete forward flight and/or allow for low speed forward maneuvering.

It will be further appreciated that the louvers 132 and/or 134 may be closed during forward flight to reduce drag on the aircraft. In this regard, the toroidal fan assembly 120 may be disengaged during forward flight. In this regard, when the louvers are closed and the toroidal fan is not operative, thrust is provided by the pusher fan assembly 140 and lift is provided by the fuselage and wings.

As shown, the pusher fan assembly 140 includes one or more rotors 142, 144 disposed within a shroud 146. Again, such rotors may be counter rotating to at least partially cancel torsional effects on the aircraft. As shown, the central axes of the rotors 142, 144 are aligned with the centerline A-A' of the aircraft, which is aligned with the direction of forward travel of the aircraft. See e.g., FIG. 1B. Accordingly, when the pusher fan assembly 140 is operative, the rotors 142, 144 provide thrust for the aircraft.

The pusher fan shroud 146 is formed on the aft portion of the fuselage 110. As shown, the shroud 146 has a cylindrical shape. In cross section, the shroud 146 may be configured as an air foil such that the shroud provides some lift. In this regard, the lift created by the shroud 146 may stabilize the aircraft in pitch and yaw directions. Further, the shroud may also protect the rotors 142, 144, increase rotor efficiency and/or reduce the aircraft's acoustic signature.

Mounted on the aft end (e.g., output end) of the shroud 146 are directional vanes 148A, 148B. A first set of the directional vanes 148A are selectively controllable to provide directional control (e.g., yaw) about the aircraft's centerline in relation to forward flight. The second directional vane 148B is operative to provide pitch control for the aircraft. In this regard, the second directional vane 148B may at least in part control elevation of the aircraft 100 during forward flight. As shown, the vanes 148A, 148B are mounted to the shroud to permit exhausted air to be channeled in a controllable manner.

Figure 4:
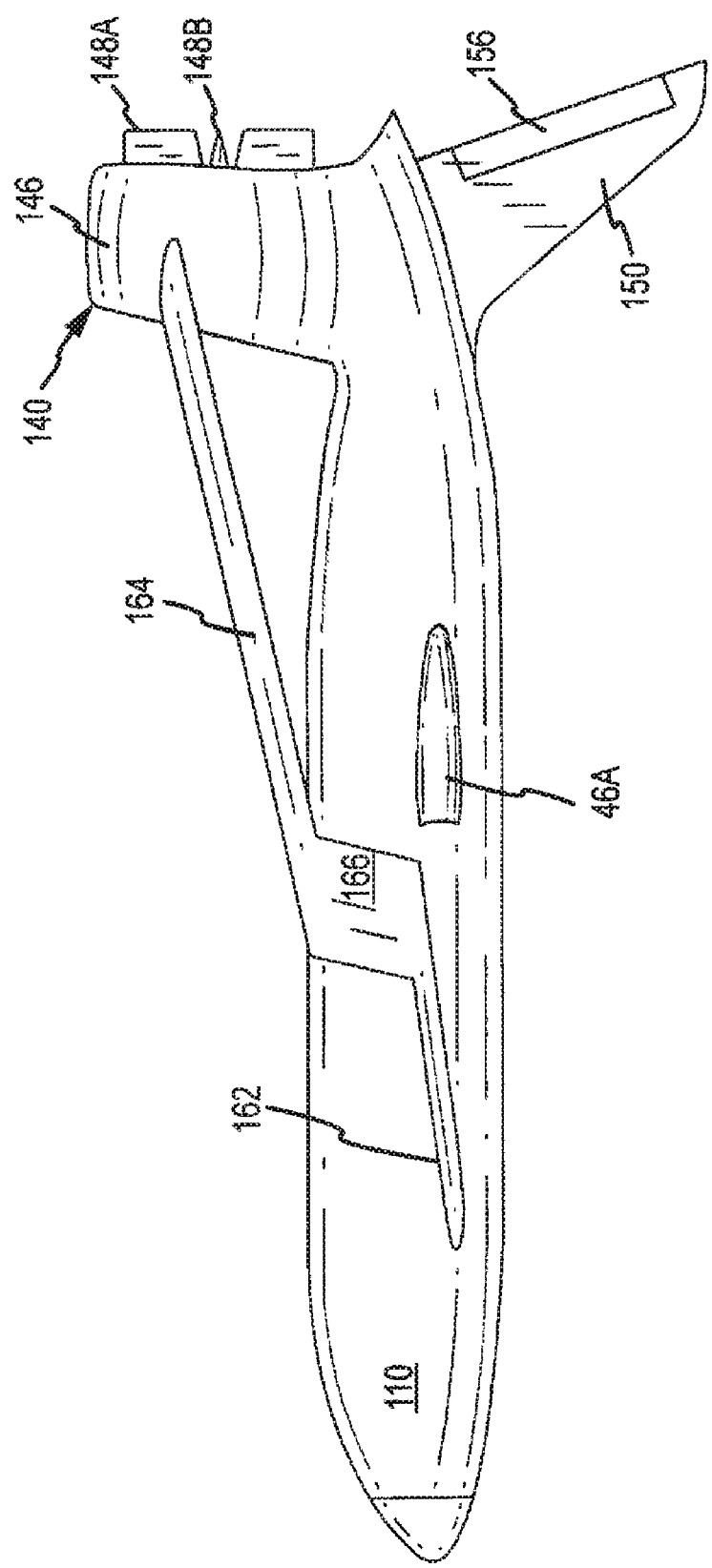
FIG. 4 illustrates a side view of the VTOL aircraft.

As illustrated in FIGS. 2A and 4, a forward edge of the fuselage is tapered for aerodynamic performance as are the outer lateral surfaces of the wing structures. Generally, the top of the fuselage 110 is contoured such that during forward flight, air is directed over the top surface of the fuselage 110 and directed into the pusher fan assembly 140. Of note, in the present embodiment the top surface of the fuselage is convex in that it initially extends upward from the leading edge of the fuselage to a highest point substantially above the ducted fan assembly 120. The fuselage then tapers downwardly until entering the pusher fan assembly 140. In some embodiments, this may provide Coanda effect lift augmentation. In this regard, air flow will pass over the leading edge of the fuselage and then down into the ducted fan assembly providing additional lift to the aircraft 100. However, it will be appreciated that the upper edge of the fuselage need not be designed in such a matter in other embodiments.

As shown in FIGS. 2A and 2B, the fuselage is utilized to house a power plant subsystem. In the present embodiment, the power plant subsystem utilizes first and second engines 40A, 40B. In order to provide inlet air for the engines, first and second inlet ducts 46A, 46B are provided on lateral opposing edges of the fuselage 110. As will be appreciated, each inlet duct 46A, 46B may be fluidly connected (e.g., ducted) to the inlet compressor of an individual engine within the fuselage 110. In one embodiment, such engines are turbine engines that provide high power to weight ratios. It will be appreciated that utilization of two or more engines provides a redundancy for the aircraft 100. In this regard, partial or full operations may be maintained utilizing a single engine if another engine becomes compromised. It will be appreciated that upon such an engine failure, a clutch assembly within the engine gearbox 42 may be utilized to disengage the output shaft of the nonfunctional engine.

As shown, the first and second engines 40A, 40B are disposed to the forward and aft portions of the fuselage 100. In this regard, placement of the engines at the forward and aft portions of the aircraft allows for maintaining a center of gravity substantially in the middle of the aircraft. More specifically, in the current embodiment the center of gravity is located through the center of the hub 128 of the ducted fan assembly 120. As discussed herein, locating of the center of gravity through the ducted fan assembly allows for releasing cargo from the aircraft 100 without significantly altering the flight characteristics of the aircraft.

The first and second engines 40, 42 are interconnected to both the ducted fan assembly 120 and the pusher fan assembly 140. As illustrated in FIG. 2A, output shafts 44A, 44B of the first and second engines 40A, 40B are interconnected to a drive train shaft 50 via first and second belts 46A, 46B, which are interconnected to pulley assemblies disposed on the ends of the output shafts 44A, 44B and opposing ends of the drive train shaft 50. Accordingly, the first and second engines 40A, 40B may be utilized in conjunction to power the drive train shaft 50.

A gear box 52 receives the drive train shaft 50 and allows for selectively providing power to the ducted fan assembly 120 and/or to the pusher fan assembly 140. In this regard, the aft end of the drive train shaft 50 is interconnected to the pusher fan assembly 140 via an aft drive shaft 54 and aft gear box 56. In the present embodiment, the gear box 52 is directly interconnected to the ducted fan assembly such that power may be provided to the first and second rotors thereof. However, the gear box assembly also permits for disengagement of the ducted fan assembly 120 and/or pusher fan 140 assembly during flight. For instance, during take off and landing procedures, no power may be provided to the ducted fan assembly via the aft drive shaft 54 and aft gear box 56. Rather, all power from the first and second engines 40A, 40B may be provided to the ducted fan assembly 120 to provide lift for the aircraft 100. During transition between vertical flight/hovering, the lower louvers may be positioned to begin forward movement of the aircraft. In conjunction with positioning of the lower louvers, power may be engaged to the pusher fan assembly 140. As the aircraft gains forward momentum, the gearbox 52 may disengage the ducted fan assembly 120. Accordingly, at such time, all power may be directed through the pusher fan assembly 140. At such time, the aircraft may operate similar to a fixed wing aircraft.

In cases of transition from high speed flight to low speed flight and/or hovering, the above noted steps are reversed. Specifically, upon slowing to a predetermined forward speed, the ducted fan assembly 120 may be reengaged in conjunction with the opening of the louvers 132, 134. In addition, the horizontal directional vane 148B may be utilized to raise the pitch of the front of the aircraft to further slow the aircraft. In conjunction with raising the pitch of the aircraft, the power to the pusher fan assembly 140 may be reduced until the ducted fan assembly 120 provides enough vertical lift to maintain the aircraft aloft. As will be appreciated, the forward speed at which the ducted fan assembly may take over from the pusher fan assembly is based on a number of variables including the size and exact configuration of the aircraft.

In addition to housing the first and second engines, it will be appreciated that the fuselage 110 also houses additional components including fuel tanks, flight control equipment, sensors, communication devices, etc. The specific components utilized by the aircraft may be selected for specific applications. In any case, it may be preferable that the various components are positioned within the fuselage to balance the aircraft around a center of gravity extending through the hub of the ducted fan assembly 140.

As best illustrated in FIGS. 1A, 1B and 3, the aircraft 100 utilizes a box wing system. More specifically, the present embodiment of the aircraft 100 utilizes a diamond box wing system wherein wings 160 on either side of the plane include an upper and lower wing that connect to forward and aft locations on the fuselage 110. The wings 160 may be defined as a forward wing 162A, 162B and a rearward wing 164A, 164B (hereafter referred to as 162 and 164, unless otherwise specified). Such a box wing configuration differs from a joined wing in that the tips of the front and rear wings 162, 164 are connected by end plates 166. Such end plates 166 provide locations for mounting additional hardware, which may include additional air foils as discussed herein.

The root of the forward wing 162 is interconnected to the fuselage 110 in front of the ducted fan assembly 140. The root of the rearward wing is interconnected to the pusher fan assembly 140 and behind the ducted fan assembly 120. In this regard, the roots of each set of the wings 160 connect in front of and behind the center of gravity of the aircraft, which extends through the center annulus of the ducted fan assembly 120. It will be appreciated that as the center of lift of each wing 162, 164 is spread apart longitudinally. The practical effect is to increase the stability of the aircraft 100. As such, the center of gravity (CG) envelope (distance between the forward CG limit and aft CG limit) increases, which results in increased stability and a more tolerant CG envelope. Stated otherwise, utilization of the diamond box wing provides additional stability about the center of gravity of the aircraft. The diamond box wing in addition to providing an improved center of gravity also increases the aspect ratio of the aircraft, thereby reducing drag and improving the climbing performance thereof.

It will be appreciated that the surfaces of the forward 162A, 162B and rearward wings 164A, 164B may be utilized to provide control surfaces for the aircraft 100. In this regard, the forward and/or rearward wings may include control surfaces such as elevators and/or ailerons. Furthermore, utilization of control surfaces on both the forward and rearward wings may provide a redundancy for the aircraft.

The fuselage 110 and wing structures 160 may be made from various types of high tensile strength materials such as composite materials and metals. Furthermore, radar absorbing materials may be utilized in the construction of the aircraft.

As noted, the end plates 166 may be utilized as mounting surfaces for the aircraft. In one embodiment, the end plates 166 are utilized to provide additional lift surfaces for the aircraft. As illustrated in FIG. 1, one or more air foils 170 may be interconnected to the end plates 166 of the box wings. In one embodiment, such air foils 170 may be selectively deployable. That is, the additional air foils 170 may be foldable such that they lay flat against the end plate 166 in a first configuration and are extendable in a second configuration. By selectively extending or folding such air foils 170, the lift surface of the aircraft may be increased or decreased, respectively. In one arrangement, illustrated by the dashed lines in FIG. 1, each end plate 166 may have first and second air foils 170A, 170B. In a high speed application, both air foils may be folded against the end plate to reduce the overall drag of the aircraft. In a second application, one of the air foils 170 may be extended to increase the overall cruise efficiency of the aircraft in forward flight. In a third arrangement, both air foils 170A may be extended in order to reduce the stall speed of the aircraft in forward flight. That is, when both air foils are extended, the aircraft may be flown in a low speed loiter configuration to provide, for example, communications and/or surveillance for extended periods of time.

To provide improved stability during forward flight, the aircraft 100 also incorporates a tailfin 150 mounted on the bottom of the fuselage 110 below the pusher fan assembly 140. In the present embodiment, a rudder 156 tailfin 150 is utilized to provide directional control for the aircraft 100.

Figure 5:
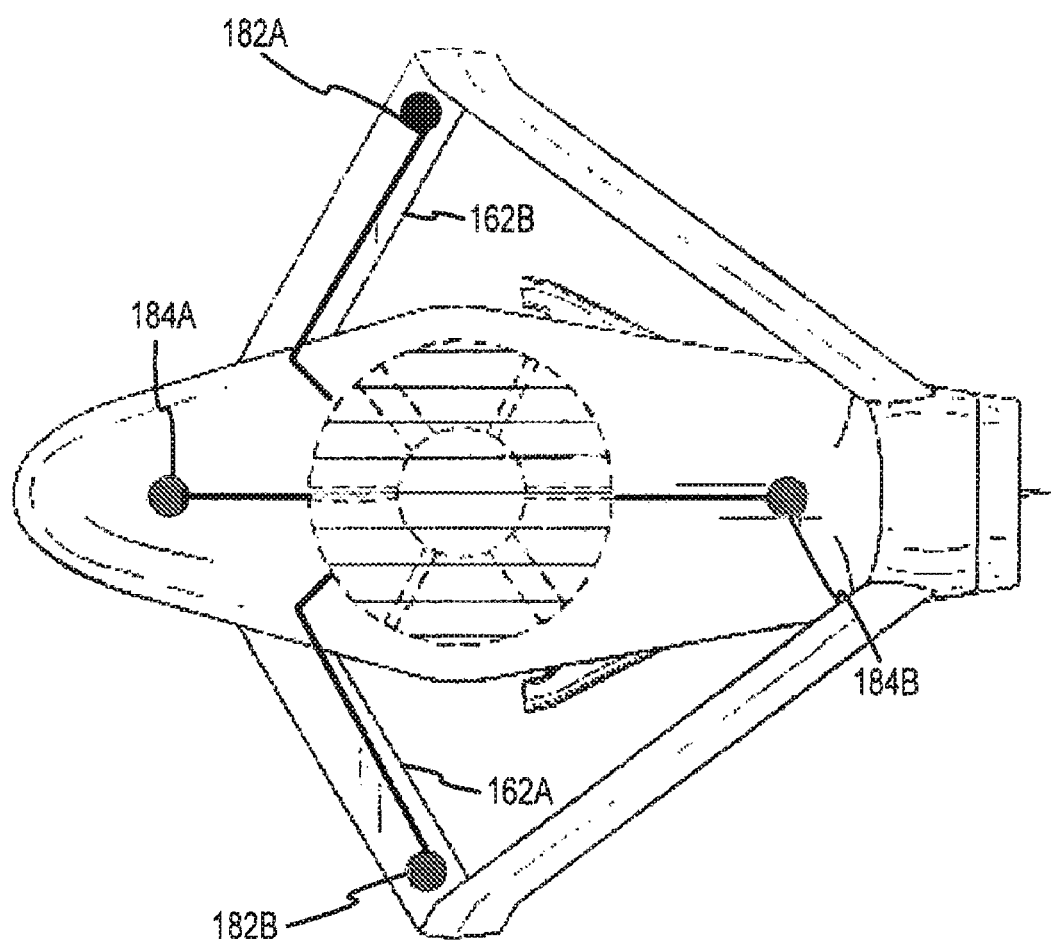
FIG. 5 illustrates a puffer jet system of the VTOL aircraft.

As noted above, the aircraft 100 is operative in a first configuration to fly at very low speeds or even hover when the ducted rotor assembly 120 is operative and the pusher fan assembly 140 is disengaged. To provide additional stability during such low speed or hovering applications, the aircraft 100 may further incorporate a puffer jet system disposed on the lower surface of the aircraft. Such a puffer jet system is illustrated in FIG. 5. As shown, the puffer jet system 180 includes four separate jetted outlets or nozzles 182A, 182B and 184A, 184B. As shown, the nozzles of the wings 182A, 182B are disposed near the tip of the forward wings 162A, 162B respectively. The fuselage nozzles 184A, 184B are disposed through the bottom surface of the fuselage 110. The first nozzle 184A is positioned towards the leading edge of the fuselage, and the other nozzle is positioned towards the aft of the fuselage. Each nozzle 182, 184 is interconnected to the shrouded fan assembly via ducting 186. This ducting allows for bleeding air from the shrouded fan assembly that may then be disposed through the puffer jet nozzles 182, 184. It will be appreciated that by providing airflow at four points about the center of gravity of the aircraft, additional stability may be provided when the aircraft is hovering. It will be appreciated that sensor systems may be utilized to adjust the amount of air jetted through each nozzle 182, 184. In this regard, sensors may monitor the side-to-side pitch and/or front-to-rear pitch of the aircraft during hovering operations and/or low speed operations. Accordingly, based on these sensed values, the puffer jet nozzles 182, 184 may be adjusted to maintain the aircraft in, for example, a stable flat and level orientation.

Figure 6:
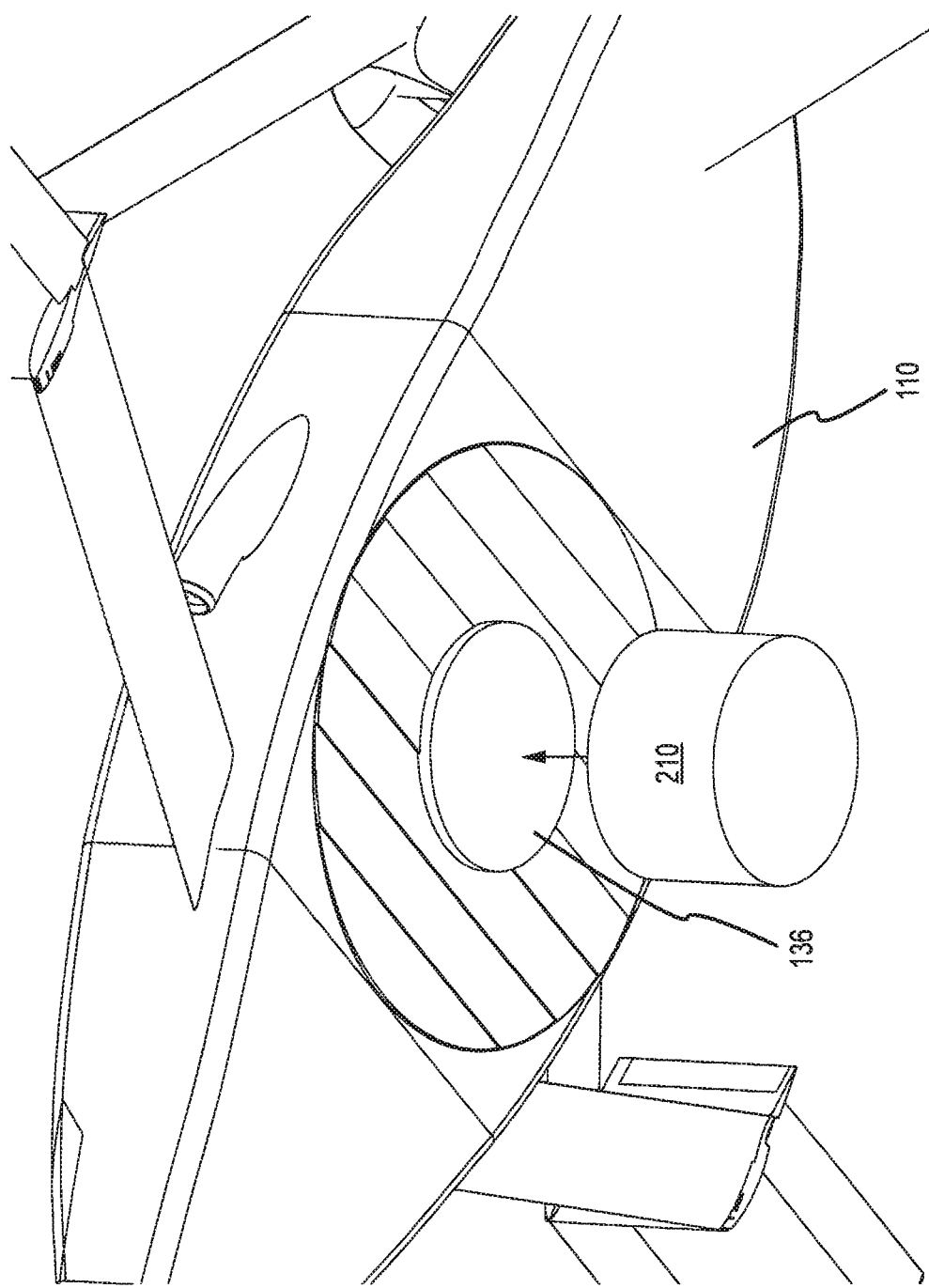
FIG. 6 illustrates connection of a payload canister with the VTOL aircraft.

As illustrated in FIG. 2A, the bottom of the ducted fan assembly 140 the area below the hub 128 of the toroidal fan assembly 140 forms a bay 136 within the bottom of the aircraft. This opening may be utilized to carry payloads and/or attach equipment to the aircraft such that the payload/equipment is disposed in substantial alignment with the center of gravity of the aircraft. More specifically, this bay 136, in the present embodiment, is a generally cylindrical opening that may be utilized to hold a cylindrical payload canister 210. See, FIG. 6. During operation, the aircraft 100 may be flown to a desired location and deploy the payload canister. A latching mechanism (not shown) may be disposed within the bay 138 for selectively attaching a deployable canister. In operation, once the aircraft has reached a desired location, the latching mechanism may be actuated to release the deployable canister. It will be appreciated that different variations of the canister may be utilized. In some instances, the canister may include a parachute to allow the canister to lower to the ground. In other instances, the aircraft may deliver the canister to the ground surface. In operation, a bottom surface of the payload canister may be flush with the bottom surface of the fuselage 110 such that the canister does not provide additional drag to the aircraft during flight. However, this is not a requirement. In other embodiments, instruments or munitions may be interconnected below the hub 128 in alignment with the center of gravity of the aircraft.

By attaching a deployable canister at the center of gravity of the aircraft, it will be appreciated that the canister may be released from the aircraft 110 without significantly altering the flight characteristics of the aircraft 120. That is, while the aircraft will be lightened by the amount of the payload canister, such releasing will not significantly affect the pitch or yaw of the aircraft and thereby reduces the controlled complexity required to maintain flight upon deploying the canister/payload.

To reduce the overall weight of the aircraft 100, the aircraft may utilize electronic control systems as opposed to hydraulic systems. However, it will be appreciated that hydraulic systems may be utilized in other configurations.

Figure 7:
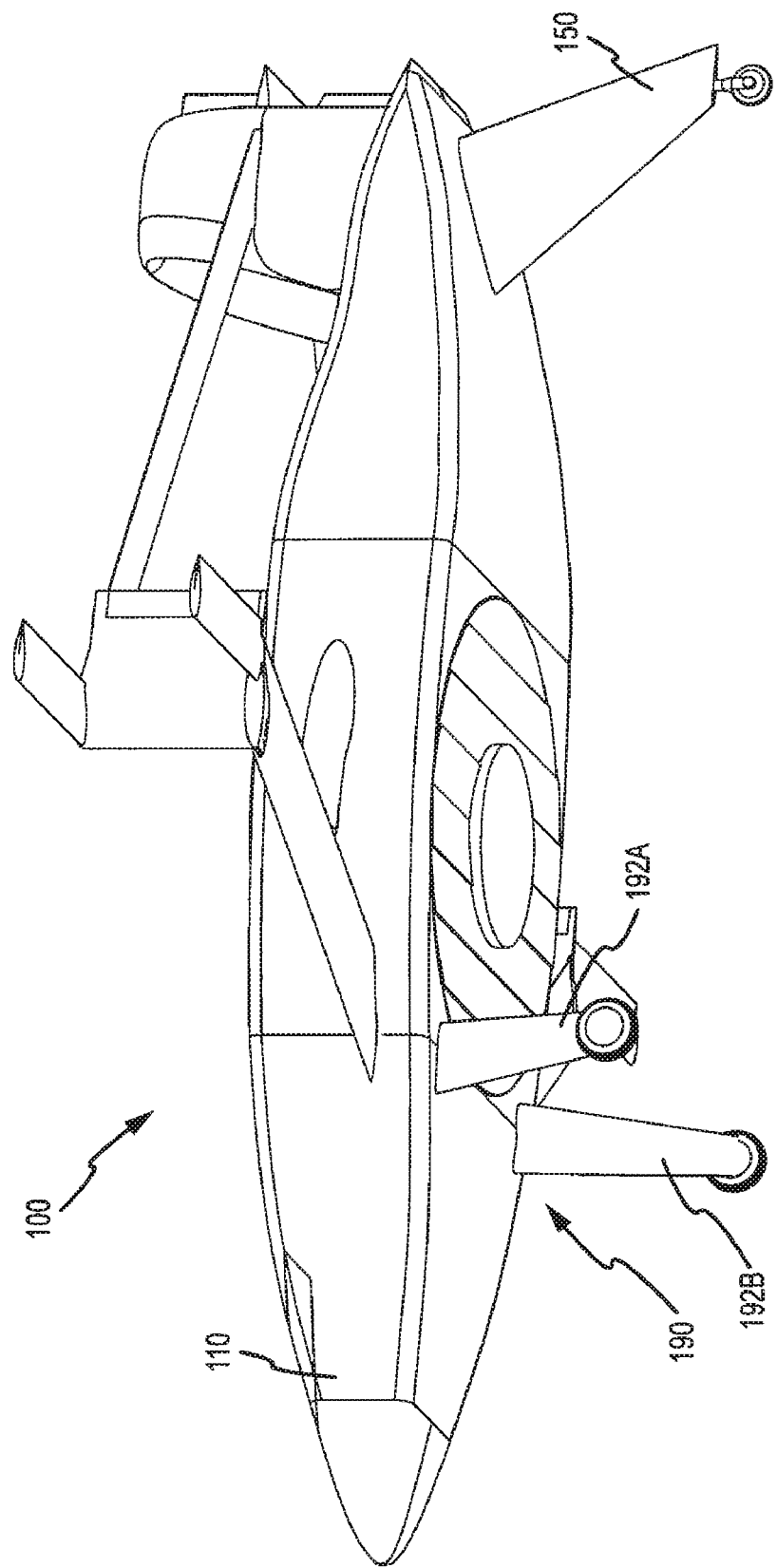
FIG. 7 illustrates landing gear of the VTOL aircraft.

FIG. 7 illustrates the landing gear assembly 190 of the aircraft 100. As shown, first and second struts 192A, 192B are interconnected to the bottom of the fuselage and may be raised and disposed into the fuselage during flight. In this embodiment, the two struts 192a, 192B and the tailfin form the landing gear for the aircraft. In order to allow the aircraft to be moved when on the surface, each of these struts and tailfin may include a wheel thereon.

Aspects of the aircraft 100 may be incorporated into various different configurations. As noted above, some of these configurations may be unmanned aerial vehicles while others may allow for manned flight. In one embodiment, a UAV in accordance with at least some of the above-noted aspects has been designed. The UAV has an overall length of approximately 20 feet, a width of approximately 16.5 feet and a height from the bottom of the tailfin to the top of the pusher fan shroud of approximately 8.5 feet. The empty weight of such an aircraft is approximately 1700 lbs. This embodiment of the UAV utilizes two 420 HP Rolls-Royce Allison Model 250 Series 3 engines and the tip diameter of the rotors of the ducted fan is 72 inches. The annulus/hub of the ducted fan assembly is 36 inches in diameter. The input shaft that turns the rotors may be rotated in excess of 2300 rpm to produce over 3000 lbs of thrust. In this embodiment, the pusher fan has a diameter of approximately 36 inches with a hub diameter of about 6 inches. Due to its reduced size, the pusher fan assembly fan may be operated at higher rpm's (e.g., in excess of 6000 rpm). Such a fan assembly may produce approximately 1000 lbs of thrust.

In this embodiment, the aircraft, in addition to have VTOL capabilities may have a cruise altitude between 15,000-25,000 feet. In addition, the aircraft is operative to perform Level-I G transition to cruise at over 275 knots. Further, the aircraft is designed to airlift 400 lbs payload up to 400 nautical miles. In such a configuration, the aircraft may further carry 260-300 lbs of fuel. It will be appreciated that the range of the aircraft may vary based on the speed of flight and/or deployment of one or more air foils 170 interconnected to the end plates 166 of the wing assemblies 160.

In this embodiment, the payload bay defined below the hub of the ducted fan assembly may receive a 32 inch diameter cylinder that may be 25 inches high as measured from the top of the bay in the ducted fan assembly to the bottom of the fuselage. In such an arrangement, over 11 cubic feet of storage may be provided in a deployable canister.

Flight systems of the aircraft may allow for autonomous flight. In this regard, a flight controller may receive a series of input signals from a series of input devices, which may include compasses and/or GPS devices. Generally, the flight controller may receive information from onboard sensors indicating the current orientation and flight characteristics of the UAV. For instance, sensors may provide information about yaw, pitch and roll axes of the aircraft as well as power output of the fan assemblies and air speed. The exact implementation operation of the control system may be similar to the control systems of the prior art.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described herein-above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed:

1. An aircraft capable of vertical takeoff and landing, stationary flight and forward flight, comprising:
    a fuselage having a forward portion, an aft portion, a top surface and a bottom surface;
    a duct extending vertically through said fuselage, said duct including an inlet on said top surface of the fuselage and an outlet on the bottom surface of said fuselage;
    a lift fan having first and second counter rotating rotors disposed within said duct, the rotational axis of said rotors defining a vertical reference axis, wherein said first and second counter rotors define a toroidal fan, wherein a diameter of a hub of said toroidal fan is larger than a blade length of said first and second rotors and wherein an area below said hub of said toroidal fan forms a payload bay for said aircraft;
    at least one engine operative to rotate said rotors; and
    a pair of wing sets, wherein each wing set includes:
        a first wing having a wing root connected to said fuselage forward of said vertical reference axis; and
        a second wing having a wing root connected to said fuselage aft of said vertical reference axis, wherein a distal portion of said first and second wings are connected.

2. The aircraft of claim 1, wherein a center of gravity of said aircraft is disposed along a centerline axis of said aircraft between forward and aft connection points of said wing sets.

3. The aircraft of claim 1, wherein a center of gravity of said aircraft is located substantially through said rotational axis of said first and second counter rotating rotors of said lift fan.

4. The aircraft of claim 1, further comprising:
    a pusher fan connected to said aft portion of said fuselage, wherein said at least one engine is operative to rotate said pusher fan.

5. The aircraft of claim 4, wherein said pusher fan further comprises:
    first and second counter rotating rotors.

6. The aircraft of claim 4, wherein said pusher fan further comprises:
    a shroud enclosing the outward edges of said pusher fan.

7. The aircraft of claim 4, further comprising:
    at least one control vane disposed aft of said pusher fan in an outlet stream of said pusher fan.

8. The aircraft of claim 4, further comprising:
    at least one transmission system attached to said at least one engine, wherein said at least one transmission system allows for selectively rotating rotors of at least one of said lift fan and said pusher fan.

9. The aircraft of claim 8, wherein said at least one transmission system comprises first and second gear boxes, wherein one of said gear boxes controls transmission of power to said lift fan and the other gear box control transmission of power to said pusher fan.

10. The aircraft of claim 4, wherein said top surface of said fuselage is convex between a leading edge of the fuselage and a location where the pusher fan is connected to the aft portion of the fuselage.

11. The aircraft of claim 1, wherein said at least one engine comprises:

first and second engines, wherein said first engine is disposed at least partially within said fuselage at a location forward of said duct and said second engine is disposed at least partially within said fuselage aft of said duct.

12. The aircraft of claim 11, wherein said first and second engines are disposed along a centerline axis of said aircraft.

13. The aircraft of claim 11, wherein said first and second engines are turbo-shaft engines.

14. The aircraft of claim 11, wherein said first and second engines are operably linked to rotate said lift fan.

15. The aircraft of claim 14, wherein one of said first and second engines may be selectively disengaged.

16. The aircraft of claim 1, further comprising:
louvers connected to said bottom surface of said fuselage, wherein said louvers are movable between a closed position and an open position, wherein said louvers substantially close said outlet of said duct in the closed position.

17. The aircraft of claim 16, wherein said louvers are oriented substantially perpendicular to a centerline axis of said aircraft.

18. The aircraft of claim 16, wherein said louvers may be controllably positioned between said open and closed positions to control a direction of airflow exiting said bottom surface of said fuselage from said duct.

19. The aircraft of claim 16, further comprising:
louvers connected to said top surface of said fuselage, wherein said louvers are movable between a closed position and an open position, wherein said louvers substantially close said inlet of said duct in the closed position.

20. The aircraft of claim 19, wherein said louvers are oriented substantially parallel with a centerline axis of said aircraft.

21. The aircraft of claim 1, wherein at least one of said wing sets includes a control surface.

22. The aircraft of claim 1, wherein each of said wing sets further comprises:
a plate connecting distal tips of said first and second wings.

23. The aircraft of claim 22, wherein each said plate defines a mounting surface for mounting objects to said aircraft.

24. The aircraft of claim 22, wherein each said plate further comprising:
at least one deployable airfoil, wherein said deployable airfoil is operative to move between a stowed position and an extended position.

25. The aircraft of claim 22, wherein each said plate further comprising:
first and second deployable airfoils, wherein one or both of said first and second deployable airfoils may be selectively moved between a stowed position and an extended position.

26. The aircraft of claim 1, further comprising at least one pair of puffer jets, wherein said puffer jets are connected to said lift fan via ducting.

27. An aircraft capable of vertical takeoff and landing, stationary flight and forward flight, comprising:
a fuselage having a forward portion, an aft portion, a top surface and a bottom surface;
a duct extending vertically through said fuselage, said duct including an inlet on said top surface of the fuselage and an outlet on the bottom surface of said fuselage;
a lift fan having first and second counter rotating rotors disposed within said duct, the rotational axis of said rotors defining a vertical reference axis;
at least one pair of puffer jets, wherein said puffer jets are connected to said lift fan via ducting;
at least one engine operative to rotate said rotors; and
a pair of wing sets, wherein each wing set includes:
a first wing having a wing root connected to said fuselage forward of said vertical reference axis; and
a second wing having a wing root connected to said fuselage aft of said vertical reference axis, wherein a distal portion of said first and second wings are connected.

\* \* \* \* \*